INVENTORS:
ANTHONY J. CARUSO,
ALFRED E. BARRINGTON,
BY
ATTORNEYS

Sept. 30, 1969　　　A. E. BARRINGTON ET AL　　　3,469,375
SORPTION VACUUM TRAP

Filed Oct. 16, 1967　　　2 Sheets-Sheet 2

INVENTORS:
ANTHONY J. CARUSO,
ALFRED E. BARRINGTON,
BY
ATTORNEYS

United States Patent Office 3,469,375
Patented Sept. 30, 1969

3,469,375
SORPTION VACUUM TRAP
Alfred E. Barrington, Lexington, and Anthony J. Caruso, Medfield, Mass., assignors to the United States of America as represented by the Administrator of the National Aeronautics and Space Administration
Filed Oct. 16, 1967, Ser. No. 676,375
Int. Cl. B01d *19/00, 53/00*
U.S. Cl. 55—208                                    6 Claims

ABSTRACT OF THE DISCLOSURE

A sorption vacuum trap having a housing with a plurality of reentrant wall portions which project into an internal gas-pervious container filled with sorbent material. The reentrant wall portions accommodate external heaters which permit bake-out and outgassing of the sorbent material.

---

Figure 1:
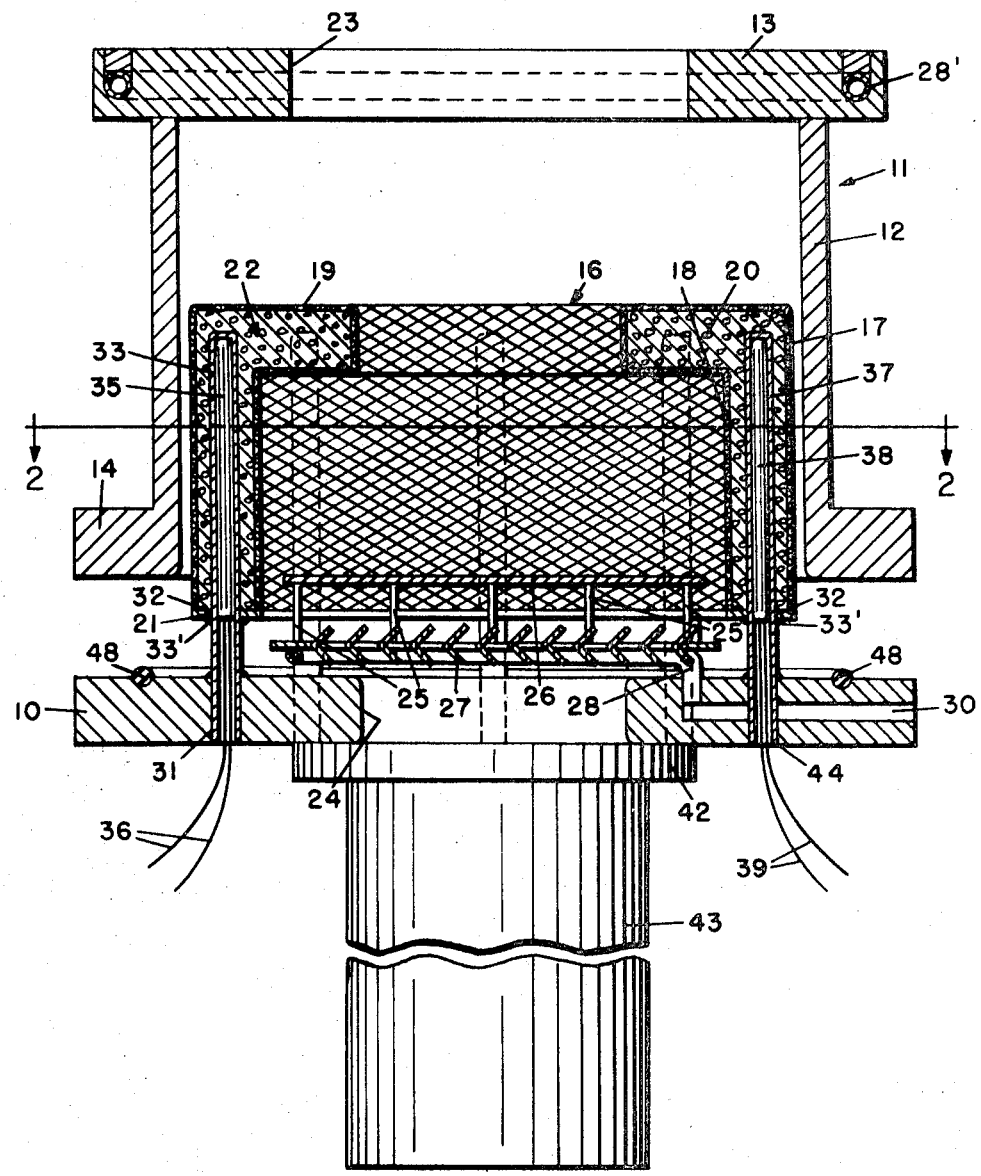

The invention described herein was made by employees of the United States Government and may be manufactured and used by or for the Government for governmental purposes without the payment of any royalties thereon or therefor.

This invention relates generally to gas and vapor traps for use in vacuum systems and, more particularly, relates to such traps which utilize a gas and vapor sorbing material.

Sorption traps have come into extensive use in a wide variety of vacuum applications. Typically, such traps are connected in a suitable gas conductance path of a high vacuum system. The sorbent material content of the trap is then effective to sorb and prevent undesired migration of gases and vapors from one portion of the high vacuum system to another. Sorption traps are especially suited for preventing unwanted passage of certain contaminating vapors such as water, mercury, oil, etc.

One disadvantage of sorption traps is their tendency to become less effective after a certain period of use under vacuum conditions or after exposure to the atmosphere. This reduced effectiveness results from a saturation of the sorbent material with sorbed gas. Rejuvenation of the trap is generally achieved by out-gassing the sorbent material, i.e., driving the sorbed gases out of the sorbent material by the application of heat. However, because of certain mechanical and vacuum problems, bake-out of commercially available sorption traps is a rather cumbersome and time consuming operation.

Two basic approaches have been utilized for rejuvenating sorption traps. The first entails the incorporation of specially designed heating mantles which supply heat through the walls of the trap into the contained sorbent material. The principal disadvantage of the external heating employed with this method is the requirement for excessively long bake-out periods. This difficulty results from the relatively poor heat transfer existing between the external heating mantle and the internal sorbent material. The problem is accentuated, of course, in relatively large traps containing sizeable volumes of sorbent material which inherently create long heat-transfer paths. Another problem associated with external heating is that since the entire trap is subjected to high temperatures, metal sealing gaskets generally must be used, whereas elastomer gaskets are considerably less expensive and easier to install.

Another approach in sorption trap design employs internal heater coils embedded in the contained sorbent material. Here again certain inherent problems have rendered such traps less than fully satisfactory. For example, replacement of defective internal heaters necessitates a complete shut-down of the entire vacuum system. Also, the requirement for internal electrical insulation which must possess suitable vacuum properties gives rise to serious material capability problems.

The object of this invention, therefore, is to provide an improved vacuum sorption trap having effective operating capabilities and which can be quickly and easily rejuvenated without shut-down of its associated vacuum system.

One feature of this invention is the provision of a sorption vacuum trap including a hollow vacuum-tight housing having a plurality of reentrant wall portions which project into a sorbent material-filled, gas pervious container within the housing. Upon energization of enclosed heater units, the hot reentrant wall portions heat and drive sorbed gases out of the surrounding sorbent material. Utilization of a plurality of reentrant heater wall portions permits efficient distribution of heat into relatively large bodies of sorbent material.

Another feature of this invention is the provision of a sorption vacuum trap of the above featured type wherein the reentrant wall portions are substantially uniformly distributed throughout the body of sorbent material and have substantially their entire inner surfaces in intimate contact therewith. This arrangement enhances the efficiency of the heat transfer process which takes place during rejuvenation.

Another feature of this invention is the provision of a sorption vacuum trap of the above featured type wherein the trap housing includes an additional reentrant wall portion which encloses a temperature responsive probe. The strategically located temperature probe permits accurate monitoring and/or automatic control of the bake-out operation.

Another feature of this invention is the provision of a sorption vacuum trap of the above featured type wherein the sorbent material container comprises a screen cage so supported within the trap housing that substantially the entire surface of the cage is spaced from the inner surfaces of the housing. This arrangement increases the area of exposed sorbent material thereby enhancing the gas sorption process.

Another feature of this invention is the provision of a sorption vacuum trap of the above featured type wherein the trap housing includes a hollow cylindrical casing having end walls formed by an inlet flange member containing a gas inlet aperture and an outlet flange member containing a gas outlet aperture; the screen cage is an annular member having spaced apart hollow cylindrical side walls and annular end walls with central openings aligned with the inlet and outlet apertures; and including a baffle mounted between the inlet aperture and the hollow central portion of the screen cage. A high degree of sorption efficiency is obtained with this structural arrangement wherein the baffle diverts gas molecules into contact with the large surface area of exposed sorbent material provided by the screen cage.

Another feature of this invention is the provision of a sorption vacuum trap of the above featured type wherein the reentrant wall portions are formed in one of the trap housing's end walls and extend into the screen cage at uniformly spaced positions about one of its annular end walls. By uniformly spacing the plurality of reentrant wall portions, a rapid and even heating of the sorbent material is obtained during the rejuvenation process.

Another feature of this invention is the provision of a sorption vacuum trap of the above featured type including a chevron baffle disposed within the gas inlet aperture and supported by the inlet flange member and further including fluid circulation coils for cooling the chevron baffle. This arrangement produces both sorption and condensation trapping in an extremely compact unit.

Figure 2:
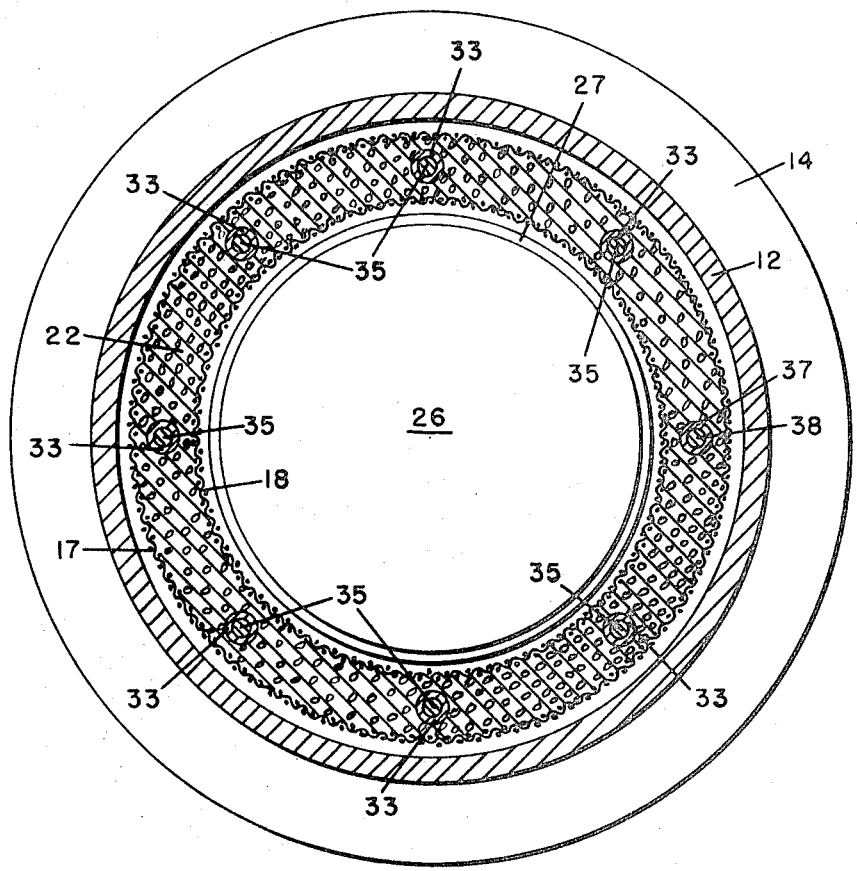

These and other features and objects of the present invention will become more apparent upon a perusal of the following specification taken in conjunction with the accompanying drawings wherein:

FIG. 1 is a side view, partly in cross-section, of a vacuum sorption trap according to the present invention; and FIG. 2 is a cross-sectional view of the trap shown in FIG. 1 taken along line 2—2.

Referring now to the drawings, there is shown the vacuum sealed trap 11 housed by the hollow cylindrical casing 12 and end walls formed by the inlet flange member 13 and the outlet flange member 14. Positioned within the casing 12 and supported from the adapter flange member 10 is the container 16. Forming the container 16 is a gas pervious screen cage having spaced apart, concentric outer 17 and inner 18 cylindrical side walls and top 19 and bottom 21 annular end walls. At the top of the cage the reentrant portion 20 projects partially into the hollow space formed by the inner wall 18. The container cage 16 is filled with a suitable sorbent material 22 such as synthetic zeolite or activated charcoal.

Located in the inlet flange member 13 and adapter flange member 10, respectively, are the inlet aperture 23 and the outlet aperture 24 both aligned with the hollow central portion of the container cage 16. Supported on legs 25 from the chevron baffle assembly 27 is the circular baffle plate 26 which provides an optical barrier between the inlet aperture 23 and the outlet aperture 24. The chevron baffle assembly 27 is supported above the outlet aperture 24 by the annular tube 28 which communicates with inlet and outlet bores 30 in the flange 10. The tube 28 which is in intimate heat conducting contact with the chevron baffle 27 is adapted to circulate cooling fluid. Another cooling tube 28' is located in an annular slot in the flange member 13. Preferably, the various internal components of the trap 11 are made of a good vacuum material such as stainless steel.

Extending through openings 31 in the adapter flange member 10 and projecting into the container cage 16 through openings 32 in the bottom wall 21 thereof are the hollow tubes 33. Demountably supporting the cage 16 on the tubes 33 are solder shoulders 33'. The tubes 33 are vacuum tightly sealed within the adapter flange openings 31 so as to form reentrant wall portions in the trap housing 11. As shown, the circularly arranged and uniformly spaced apart hollow tubes 33 have substantial inner surface areas in intimate contact with the sorbent material 22 within the container cage 16. Extending into the hollow tubes 33 and closely accommodating the adjacent walls thereof are the electrical immersion heaters 35 having electrical leads 36 adapted for connection to a suitable source of electric current (not shown). One of the hollow tubes 37 provides an auxiliary function by enclosing the temperature responsive probe 38. Extending from the temperature probe 38 are electrical output leads 39 adapted for connection to conventional indicating or control devices (not shown).

As shown in FIG. 1, the adapter flange member 10 is joined to the diffusion pump 43 by the mating flange 42. The inlet port of the diffusion pump 43 is aligned with the aperture 24 in the adapter flange 10. Vacuum tight seals between the mating flanges are provided by the O-ring gasket 48.

During operation of the invention, gases and vapors circulating between a chamber (not shown) being evacuated and the diffusion pump 43 must pass through the vacuum trap 11. Certain components of this fluid are sorbed in the conventional manner upon contact with the sorbent material 22. For example, the trap 11 sorbs backstreaming pumping fluid from the diffusion pump 43 thereby preventing contamination of the connected vacuum system. Similarly, certain fluid substances such as water vapor which are not easily pumped by the diffusion pump 43 are sorbed by the sorbent material 22. Because of the reduction in contaminants effected by the sorption trap 11, a substantially lower ultimate vacuum is attainable in the vacuum system.

A high degree of trap efficiency is insured by the large exposed surface area exhibited by the container cage 16. This large surface area is obtained by freely supporting the container cage 16 within the trap housing 11 such that all surfaces of the cage are spaced from the inner surfaces of the housing 11. The increased surface area also increases the volume of sorbent material 22 which can be effectively utilized. Trapping efficiency is improved also by the circular baffle 26 which prevents direct gas flow between the inlet aperture 23 and outlet aperture 24 thereby increasing the probability of molecular contact with the sorbent material 22. Additional trapping action is produced by the chevron baffle surfaces 27 which are cooled as a result of fluid coolant circulating in the tube 28 and thereby condense some portion of the contaminating vapors passing through the inlet aperture 24.

After a given quantity of gas has been sorbed, the sorbent material 22 becomes somewhat saturated and therefore relatively ineffective. At that time the trap 11 can be isolated from the vacuum system with suitable valve (not shown) and the sorbent material 22 rejuvenated by driving out the sorbed gases. The outgassing procedure is initiated by energizing the heaters 33 to produce heat transfer through the walls of the hollow tubes 33 and into the surrounding sorbent material 22. Bake-out for a given period at an elevated temperature of, for example, 350°–450° C. drives out of the sorbent material 22 substantially all of the sorbed gases which are removed by the diffusion pump 43 and an associated vacuum fore pump (not shown). This out-gassing procedure fully restores the sorption properties of the sorbent material to again render it full effective for the above described trapping functions.

It will be appreciated that, since the heater units 33 are located outside the vacuum system, defective units can be replaced without exposure of the system to atmosphere. Nevertheless, the reentrant wall surfaces of the hollow tubes 33 which are in intimate contact with the body of sorbent material 22 exhibit therewith extremely good heat transfer characteristics. Accordingly, the time required for rejuvenation of the trap is minimized. In this regard, the use of a plurality of reentrant wall portions is particularly important because it both increases and distributes the area of wall surface in good heat transfer contact with the sorbent material 22. This is especially significant in relatively large traps of, for example, 10 inch or more diameter wherein the volume of contained sorbent material is relatively large.

A further operational advantage is provided by the auxiliary hollow tube 37 and the associated temperature responsive probe 38. The probe which is in good heat conducting relationship with the sorbent material 22 generates in the signal lines 39 an electrical current proportional to the material's temperature. This signal can be used either with conventional meters for indicating the bake-out temperature or with conventional control equipment for suitably controlling energization of the heating units 33.

In addition, periodic cleaning of the individual trap components is relatively simple because of the unique configuration illustrated herein. Upon disconnection and separation of the flange members 10 and 14, the cage 16 is easily removed from the tubes 33. This allows convenient cleaning of the exposed baffle plate 26 and chevron baffle assembly 27.

Obviously, many modifications and variations of the present invention are possible in light of the above teachings. For example only, although the invention is described in connection with the preferred embodiment of a gas and vapor trap, it will be appreciated that the inventive features could be utilized in other sorption devices such as sorption vacuum pumps. It is, therefore, to be understood that within the scope of the appended claims the invention can be practiced otherwise than as specifically described.

What is claimed is:

1. A sorption vacuum trap, comprising a hollow vacuum tight housing having gas inlet and outlet apertures, said housing being formed of a hollow cylindrical casing having end walls formed by an inlet flange member containing said inlet aperture and an outlet flange member containing said outlet aperture, a molecular gas-pervious container located within said housing, said container comprising a cage formed of screen material and so supported within said housing that substantially the entire outer surface of said cage is spaced from the inner surfaces of said housing, said cage being an annular member having spaced apart hollow concentric cylindrical side walls and annular end walls with central openings aligned with said inlet and outlet apertures, a body of gas sorbent material disposed within said container and between said side walls, said housing having a plurality of re-entrant wall portions extending into said container and in intimate contact with said sorbent material, baffle plate means mounted within said central openings of said cage and aligned with said inlet aperture and said outlet aperture and adapted to divert gas molecules entering said inlet aperture into contact with said sorbent material, a chevron baffle positioned between said baffle plate means and said outlet aperture and supported by said outlet aperture and a plurality of heaters disposed within said re-entrant wall portions and adapted upon energization to heat said sorbent material.

2. A sorption vacuum trap according to claim 1 wherein said reentrant wall portions are formed in one of said housing end walls and extend into said annular cage.

3. A sorption vacuum trap according to claim 2 wherein substantially the entire inner surfaces of said reentrant wall portions are in contact with said sorbent material.

4. A sorption vacuum trap according to claim 3 wherein said reentrant wall portions extend into said cage at uniformly spaced positions about one of said annular end walls.

5. A sorption vacuum trap according to claim 4 wherein said housing includes an auxiliary reentrant wall portion, and including a temperature responsive probe means disposed within said additional reentrant wall portion.

6. A sorption vacuum trap according to claim 5 including means for cooling said chevron baffle.

References Cited

UNITED STATES PATENTS

| | | | |
|---|---|---|---|
| 2,777,759 | 1/1957 | Sokolik | 55—388 |
| 3,137,551 | 6/1964 | Mark | 55—269 |
| 3,199,343 | 8/1965 | Childs et al. | 230—69 |
| 3,224,168 | 12/1965 | Gregory | 55—208 |
| 3,264,803 | 9/1966 | Read | 55—208 |
| 3,335,550 | 8/1967 | Stern | 55—208 |

REUBEN FRIEDMAN, Primary Examiner

C. N. HART, Assistant Examiner

U.S. Cl. X.R.

230—69